(12) United States Patent
Back et al.

(10) Patent No.: US 6,956,086 B2
(45) Date of Patent: Oct. 18, 2005

(54) WATER DISPERSIBLE EPOXY RESINS

(75) Inventors: Gayle Edward Back, Houston, TX (US); Pen-Chung Wang, Houston, TX (US); Larry Steven Corley, Houston, TX (US); Jimmy D. Elmore, Houston, TX (US)

(73) Assignee: Resolution Performance Products, LLC, Houston, TX (US)

( * ) Notice: Subject to any disclaimer, the term of this patent is extended or adjusted under 35 U.S.C. 154(b) by 189 days.

(21) Appl. No.: 10/671,224

(22) Filed: Sep. 24, 2003

(65) Prior Publication Data
US 2004/0063901 A1 Apr. 1, 2004

Related U.S. Application Data

(62) Division of application No. 09/733,290, filed on Dec. 8, 2000, now Pat. No. 6,653,436.

(51) Int. Cl.[7] .................. C08L 63/00; C08L 77/06; C08F 283/00
(52) U.S. Cl. .................. 525/423; 525/430; 525/533
(58) Field of Search ................ 528/271, 310, 528/332, 335, 338, 339, 342, 350, 363, 365, 366, 418, 421, 422; 525/418, 419, 420, 422, 423, 430, 449, 523, 533, 540

(56) References Cited

U.S. PATENT DOCUMENTS

| | | | |
|---|---|---|---|
| 3,280,054 A | 10/1966 | Gotze et al. .................. 260/18 |
| 3,474,056 A | 10/1969 | Schneider et al. ............. 260/18 |
| 3,870,666 A | 3/1975 | Becker .......................... 260/21 |
| 4,122,067 A | 10/1978 | Anderson ..................... 528/89 |
| 4,315,044 A | 2/1982 | Elmore et al. .............. 427/386 |
| 4,423,166 A | 12/1983 | Moriarity et al. ............ 523/414 |
| 5,017,675 A | 5/1991 | Marten et al. ............... 528/111 |
| 5,118,729 A | 6/1992 | Piechocki .................... 523/404 |
| 5,128,441 A | * 7/1992 | Speranza et al. ............ 528/335 |
| 5,166,423 A | 11/1992 | Fried .......................... 562/537 |
| 5,236,974 A | 8/1993 | Dreischhoff et al. ........ 523/403 |
| 5,250,727 A | 10/1993 | Fried .......................... 562/540 |
| 5,319,004 A | 6/1994 | Marten et al. ............... 523/404 |
| 5,356,961 A | 10/1994 | Nishimura et al. ......... 523/414 |
| 5,478,872 A | 12/1995 | Yamasoe et al. .............. 524/45 |
| 5,494,705 A | 2/1996 | Yamasoe et al. ............ 427/327 |
| 5,596,030 A | 1/1997 | Walker ........................ 523/404 |
| 5,602,193 A | 2/1997 | Stark .......................... 523/403 |
| 5,643,976 A | 7/1997 | Arora et al. ................. 523/404 |
| 5,741,835 A | 4/1998 | Stark .......................... 523/403 |
| 5,750,595 A | 5/1998 | Arora et al. ................. 523/404 |
| 5,786,429 A | 7/1998 | Allen .......................... 525/430 |
| 5,874,490 A | 2/1999 | Arora et al. ................. 523/414 |

FOREIGN PATENT DOCUMENTS

| | | | |
|---|---|---|---|
| DE | 2332177 | 2/1974 | ........... C08G/30/14 |
| EP | 0000605 A1 | 7/1978 | ........... C08G/59/18 |
| JP | 6-287276 | 10/1994 | ........... C08G/59/50 |
| WO | WO 96/20978 | 7/1996 | ........... C08L/63/00 |

* cited by examiner

Primary Examiner—Michael J. Feely

(57) ABSTRACT

A amidoamine composition containing oligomeric amidoamine compounds having the structure:

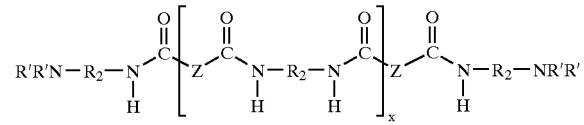

the average of x based on the amidoamine composition is at least 0.2, and Z is the residue of a polyoxyalkylene polyether polycarboxylic acid compound, and the amidoamine composition is the reaction product of primary polyamine compounds with polyoxyalkylene polyether polycarboxylic acid compounds at a corresponding equivalent weight ratio of at least 4.0:1 under oligomeric reaction conditions effective to increase the amine nitrogen equivalent weight of the amidoamine composition by at least 10% over the average acid equivalent weight of said polyoxyalkylene polyether polyacid composition. There is also provided glycidated amidoamine compositions used as epoxy functional surfactants, and the aqueous epoxy resin dispersions thereof, and the curable epoxy resin compositions thereof.

24 Claims, No Drawings

WATER DISPERSIBLE EPOXY RESINS

RELATED APPLICATION DATA

The present application is a divisional of U.S. patent application Ser. No. 09/733,290 filed Dec. 8, 2000, now issued as U.S. Pat. No. 6,653,436.

FIELD OF INVENTION

This invention relates to aqueous dispersions of epoxy resins. In one aspect, the invention relates to improved aqueous dispersions of epoxy resins, containing an epoxy functional surfactant, which provide improved coating properties and a process to prepare such dispersions.

BACKGROUND OF THE INVENTION

Aqueous dispersions of epoxy resins have been known for many years. However, the performance of these dispersions as elements of coatings has been viewed as inferior to their solvent borne counterparts. It is known that the surfactants employed to render the epoxy component emulsifiable such as nonylphenol ethoxylates, alkylphenol initiated poly(oxyethylene) ethanols, alkylphenol initiated poly(oxypropylene) poly(oxyethylene) ethanols, and block copolymers containing an internal poly(oxypropylene) block and two external poly(oxyethylene) ethanol blocks readily migrate to surface interfaces where, it is speculated, they deleteriously affect film performance.

Moreover, as aqueous dispersions of epoxy resins have become more widely used in industry, improved handling properties such as storage stability are required. The storage stability of many water borne epoxy dispersions degrades over time due to the presence of amine nitrogen atoms in the surfactant molecules. As the pH of water borne dispersions increases over 9.8, the storage stability can no longer be measured in years, but rather is measured in months.

It would also be desirable to decrease the particle size of the solids, or decrease the amount of surfactant required at a given solids level, or to disperse solids at a given particle size using less surfactant. Often, a larger amount of surfactant needed to decrease the particle size and effectively disperse the solids in water leads to increased pH and reduced storage stability. Decreasing the surfactant level to control the pH causes an increase in particle size.

SUMMARY OF THE INVENTION

There is now provided a surfactant which effectively lowers the pH of an epoxy resin water borne dispersion while maintaining small particle sizes.

In one embodiment of the invention, there is provided an epoxy functional surfactant comprising the reaction product of:

i) an amidoamine composition comprising oligomeric amidoamine compounds having the structure:

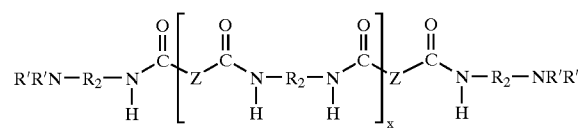

wherein each R' is independently hydrogen or an alkyl group containing 1–6 carbon atoms provided that at least one R' is hydrogen, preferably two R' are hydrogen, most preferably all four R' are hydrogen, wherein $R^2$ is an aliphatic, cycloaliphatic, or aromatic residue of a primary amine compound having 2 to 24 carbon atoms and optionally containing non-reactive oxygen or at most an average of 4 secondary and/or tertiary nitrogen atoms in the backbone of the primary amine compound, and preferably $R^2$ is an aliphatic moiety having from 2 to 8 carbon atoms, the average of x based on the amidoamine composition is at least 0.2, and Z comprises the residue of a polyoxyalkylene polyether polycarboxylic acid compound; with ii) at least one epoxy resin having a functionality of from greater than 0.8 epoxide group per molecule at an equivalent weight ratio of the epoxy resin to the amidoamine composition of at least 2:1; wherein the amidoamine composition comprises the reaction product of primary polyamine compounds with polyoxyalkylene polyether polycarboxylic acid compounds at a corresponding equivalent weight ratio of at least 4.0:1 under oligomeric reaction conditions effective to increase the amine nitrogen equivalent weight of the amidoamine composition by at least 10% over the average acid equivalent weight of the polyoxyalkylene polyether polyacid composition.

In another embodiment of the invention, there is an epoxy functional surfactant comprising the reaction product of:

i) an amidoamine composition comprising oligomeric amidoamine compounds in an amount of at least 20 wt. % to 80 wt. % based on the weight of amidoamine composition, said oligomeric amidoamine compounds having the structure:

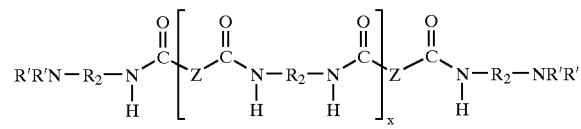

wherein each R' is independently hydrogen or an alkyl group containing 1–6 carbon atoms provided that at least one R' is hydrogen, preferably two R' are hydrogen, most preferably all four R' are hydrogen, wherein $R^2$ is an aliphatic, cycloaliphatic, or aromatic residue of a primary amine compound having 2 to 24 carbon atoms and optionally containing non-reactive oxygen or at most an average of 4 secondary and/or tertiary nitrogen atoms in the backbone of the primary amine compound, and preferably $R^2$ is an aliphatic moiety having from 2 to 8 carbon atoms, the average of x based on the amidoamine composition is at least 0.2, and Z comprises the residue of a polyoxyalkylene polyether polycarboxylic acid compound; with ii) at least one epoxy resin having a functionality of from greater than 0.8 epoxide group per molecule at an equivalent weight ratio of the epoxy resin to the amidoamine composition of at least 2:1; wherein the amidoamine composition comprises the reaction product of primary polyamine compounds with polyoxyalkylene polyether polycarboxylic acid compounds at a corresponding equivalent weight ratio of at least 4.0:1.

In a further embodiment of the invention, there is provided an aqueous dispersion of an epoxy resin comprising the epoxy-functional surfactant of the invention.

DETAILED DESCRIPTION OF THE INVENTION

As used throughout, the terms "comprising" and "containing" are open ended and mean the inclusion of at least the identified ingredients, methods, etc, but do not preclude the addition of other ingredients, methods, etc.

By manufacturing and using the oligomeric amidoamine compounds in the amidoamine composition as a starting material to make the water borne epoxy resin dispersions, the efficiency of the epoxy functional surfactant increases. In other words, less amidoamine composition used to make the epoxy functional surfactant is required to disperse the same quantity of solids to the same particle size in the dispersion compared to an epoxy functional surfactant made without any oligomeric amidoamine compounds.

Alternatively, in view of the increased dispersion efficiency of the epoxy functional surfactants of the invention, one may choose to increase the amount of amidoamine composition used to make the epoxy functional surfactant up to conventional levels typically used with surfactant containing little or no oligomeric amidoamine compounds and thereby achieve a reduction in the particle size of the solids in the dispersion.

Further, by manufacturing and using the oligomeric amidoamine compounds in the amidoamine composition as a starting material to make the water borne epoxy resin dispersions, the pH of the resulting water borne dispersion can be reduced leading to greater stability and lengthened shelf life. The combination of greater epoxy functional amidoamine surfactant efficiency and lowered active nitrogen sites significantly reduces the pH of the water borne dispersion (e.g. from 9.5 to 9.2). In one embodiment, the pH of the aqueous epoxy resin dispersions of the invention is less than 9.5, as measured one month after manufacture while kept at a storage temperature of 23° C. Preferably, the pH is maintained at less than 9.5 one year after manufacture. In another preferable embodiment, the pH is less than 9.4, and more preferably is 9.3 or less, as measured one month after manufacture while kept at a storage temperature of 23□C.

Manufacture of the Amidoamine Composition

The amidoamine composition of the invention comprises oligomeric amidoamine compounds represented by the following structural formula:

Formula I

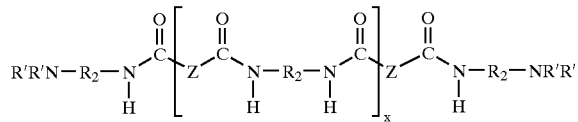

wherein each R' is independently hydrogen or an alkyl group containing 1–6 carbon atoms provided that at least one R' is hydrogen, preferably two R' are hydrogen, most preferably all four R' are hydrogen, $R^2$ is the aliphatic, cycloaliphatic, or aromatic residue of a primary polyamine compound having 2 to 18 carbon atoms and optionally containing non-reactive oxygen or at most an average of 4 secondary and/or tertiary nitrogen atoms in the backbone of the primary amine compound, and preferably $R^2$ is an aliphatic moiety having from 2 to 8 carbon atoms, wherein the average of x's in the total amidoamine composition is at least 0.2. The average value of x as used herein is determined by analyzing the composition using Gel Permeation Chromatography and calculating the average value of x from the peak area percentages. The average value of x is more preferably from 0.25, and even at least 0.3, and up to 2.0. Generally, the average value of x ranges from greater than 0 up to 1.5. Suitable dispersions can also be made when the average value of x is up to only 1.0, and even up to only 0.8. Z comprises the residue of a polyoxyalkylene polyether polycarboxylic acid compound.

The amidoamine composition is manufactured by combining and reacting under oligomerization reaction conditions a primary polyamine composition with a polyoxyalkylene polyether polycarboxylic acid composition. Suitable primary polyamine compounds used in the primary polyamine composition are any compounds, individually or in mixture, having 2 to 24 carbon atoms and optionally containing non-reactive oxygen or at most an average of 4 secondary and/or tertiary nitrogen atoms in the backbone of the primary amine compound, and preferably $R^2$ is an aliphatic moiety having from 2 to 8 carbon atoms, and further containing at least one primary amine group, preferably containing at least two primary amine groups.

A non-limiting example of primary polyamine compounds useful in the practice of the invention is represented by the formula:

Formula II

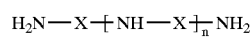

wherein n is an average of integers between about 0 and 10, preferably between 0 and 4; and X is a divalent branched or unbranched hydrocarbon radical having about 1–24 carbons, one or more aryl or alkaryl groups, or one or more alicyclic groups, provided that the primary polyamine compound has a total of from 2–18 carbon atoms. Preferably, X is a lower alkylene radical having 1–10, preferably 2–6, carbon atoms. Such alkylene polyamines include ethylene polyamines, butylene polyamines, propylene polyamines, pentylene polyamines, hexylene polyamines, heptylene polyamines, etc. The higher homologs of such amines and related aminoalkyl-substituted piperazines are also included. Specific examples of polyamines include ethylene diamine, triethylene tetramine, tris(2-aminoethyl)-amine, 1,2- and 1,3-propylene diamine, trimethylene diamine, 1,2- and 1,4-butanediamine, 2-methyl-1,5-pentanediamine, hexamethylene diamine, decamethylene diamine, octamethylene diamine, diethylene triamine, triethylene tetramine, di(heptamethylene)triamine, tripropylene tetramine, tetraethylene pentamine, trimethylene diamine, pentaethylene hexamine, di(trimethylene)triamine, p- and m-xylylene diamine, methylene dianiline, 2,4-toluenediamine, 2,6-toluenediamine, polymethylene polyphenylpolyamine, diaminocyclohexane, isophoronediamine, 1,3-bis(aminomethyl)cyclohexane, 4,4'-diaminodicyclohexylmethane, and mixtures thereof. Higher homologs, obtained by condensing two or more of the above-illustrated alkylene amines, are also useful.

Examples of the preferred polyamines are ethylenediamine, hexamethylenediamine, 2-methyl-1,5-pentanediamine, and 1,12-dodecanediamine. Most preferred is 2-methyl-1,5-pentanediamine in view of its optimal boiling point, ease of stripping, and low cost. It is also liquid at room temperature, and does not tend to form imidazoline end groups. Aminoethylpiperazine can also be used and has the advantage of yielding material with predominantly secondary nitrogen end groups (as described below). However, it is preferred to use amines with the fewest nitrogen atoms in the backbone.

Any of the mentioned primary polyamine compounds can be used singly or in mixture with other primary polyamine compounds.

Hydroxy polyamines, e.g., alkylene polyamines having one or more hydroxyalkyl substituents on the nitrogen atoms, are also useful in preparing amides of this invention. Preferred hydroxyalkyl-substituted alkylene polyamines are those in which the hydroxyalkyl group has less than about 10 carbon atoms. Examples of such hydroxyalkyl-substituted polyamines include N-(2-hydroxyethyl)-ethylene diamine, N,N'-bis(2-hydroxyethyl)ethylene diamine, monohydroxypropyl-substituted diethylene triamine, dihydroxypropyltetraethylene pentamine and N-(3-hydroxybutyl)tetramethylene diamine. Higher homologs obtained by condensation of the above-illustrated hydroxyalkyl-substituted alkylene amines through amino and hydroxyl groups are likewise useful. The polyoxyalkylene polyether polycarboxylic acid compound has a hydrophilic moiety of a nature and length effective, once reacted with the primary polyamine compound and the epoxy resin, to disperse an epoxy resin in water. The amount of epoxy functional amidoamine surfactant necessary to stably disperse solids in the water borne epoxy resin dispersions at a solids level, based on the weight of the whole dispersion, preferably from 45 wt % or more, more preferably 50 wt. % or more, and most preferably 60 wt. % or more, preferably ranges from only 1 wt % to 10 wt %, preferably 2 wt %to 7 wt %, more preferably only 2 wt % to less than 6.0 wt %, most preferably from 2 wt. % to less than 5.0 wt. %, based on the weight of solids in the dispersion. While one may use more than 10 wt. % epoxy functional surfactant composition, or make an aqueous dispersion of less than 45 wt % solids, the epoxy functional surfactant composition employed to disperse the epoxy resins have the ability to stably disperse at least 45 wt. % solids at epoxy functional surfactant levels of 2 to 7 wt. % without any noticeable phase separation to the naked eye after 1 year of ambient still storage.

The average particle size in the aqueous epoxy resin dispersions of the invention are also quite small, on the order of less than 1.00 μm, preferably 0.55 μm or less, more preferably 0.50 μm or less. It is desirable to use as small a particle size as possible at as high a solids level as possible to obtain improved economics and improved coalescence, thereby obtaining optimum film mechanical properties.

The polyoxyalkylene polyether polycarboxylic acid compound can be represented by the following formula:

Formula III

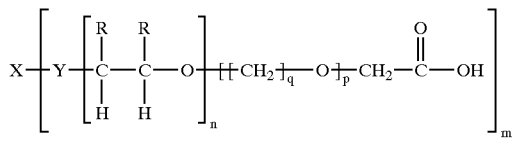

wherein X is an initiator molecule residue, the initiator having a functionality of from 1 to 8; Y represents an oxygen or nitrogen atom; each of the R's are independently a hydrogen, a $C_1$–$C_{16}$ alkyl, aryl, or alkaryl group, preferably hydrogen, a $C_1$–$C_4$ alkyl or nonylphenyl, most preferably hydrogen, methyl, or an ethyl group, provided that at least one R is a hydrogen; m is a real number from 1.0 to 8.0; n and p represent the number of repeating units of oxyalkylene groups effective to stably disperse the epoxy resin in water, which can range from 0 to about 4000, preferably from about 50 to 1000, provided that n+p is at least 15, and q is 2 or 4, inclusive, preferably 2, and m is a real number greater than 1.0 and up to 3.0.

In the above Formula III, the depicted sequence of groups is not intended to represent an order or a block structure. The above Formula III is broadly read as representing random structures, block structures, or random-block structures. Further, the n units and the n+p units broadly represent a homo or block or random selection. For example, the n units or the n+p units may represent n repeating units of oxyethylene groups, a random mixture of oxyethylene and oxypropylene groups, or blocks of oxyethylene and oxypropylene groups in any sequence. Further, the n and p units may be the same, as in the case of an oxyethylene homopolymer or different as in the as in the case of a PO/EO, EO/PO, EO/BO, or EO/BO block or random copolymer. Generally, the quoted number of units is the whole number closest to the statistical average, and the peak of the distribution. Positive real numbers as used herein refer to a number which is positive and includes integers and fractions of integers.

The polyoxyalkylene polyether polycarboxylic acid composition preferably has a number average molecular weight within the range of from about 2000, preferably from about 3000, to about 10,000, preferably to about 8,000, more typically to about 6,000.

With respect to Formula III above, the hydrophilic carboxylic acid can be produced through the oxidation of a polyoxyalkylene molecule by any conventional known process, including, but not limited to, the processes described in U.S. Pat. No. 5,250,727, incorporated herein by reference.

In a more typical embodiment, the n units represent oxyethylene or oxyethylene and oxypropylene groups, p is 0, both R groups are hydrogen, m (representing the average acid functionality) is a real number greater than 1.0 and up to 2.0, and the number average molecular weight ranges from 3000 to about 6,000. In a more preferred embodiment, m ranges from 1.6 to 2.0, most preferably from 1.7 to 1.95.

The hydrophilic polyoxyalkylene molecule may be prepared by reacting an initiator molecule with an alkylene oxide under oxyalkylation conditions well known to those of ordinary skill in the art of polyether polyols, such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459.

Any suitable alkylene oxide may be used such as ethylene oxide, propylene oxide, butylene oxide, amylene oxide, and mixtures of these oxides. The polyoxyalkylene monools and polyols may be prepared from other starting materials such as tetrahydrofuran and alkylene oxide-tetrahydrofuran mixtures; epihalohydrins such as epichlorohydrin; as well as aralkylene oxides such as styrene oxide. The particular individual or combination of alkylene oxides chosen must be effective to stably disperse the particular species of resin in water.

The alkylene oxides may be added to the initiator, individually, sequentially one after the other to form blocks, in mixture to form a hetero-polyether, or blocks of mixed oxyalkylene and homogeneous oxyalkylene groups. Suitable homo polyoxyalkylene monools and polyols include polyoxyethylene monool or polyol, and polyoxytetramethylene monool or polyol. Suitable block copolymers include, for example, blocks of polyoxypropylene and polyoxyethylene, poly-1,2-oxybutylene and polyoxyethylene, polyoxy-1,4-tetramethylene and polyoxyethylene. The blocks of polyoxypropylene or polyoxybutylene are preferably internal relative to the outermost block of other polyoxyalkylenes. Other copolymers include the heteric copolymer monools and polyols prepared from blends, optionally with sequential addition, of two or more alkylene oxides. The polyalkylene polyether polyols should, however, be terminated with primary hydroxyl groups. Polyoxyalkylene molecules containing ethylene oxide are suitable, such as those having an EO/PO/EO block structure, or a PO/EO block structure, or a random EO-PO structure tipped with EO.

The initiator molecule can be polyfunctional or a mixture of monofunctional and polyfunctional. The functionality of the polyoxyalkylene polyether polycarboxylic acid composition will nominally be that of the initiator. The actual functionality of the surfactant molecule will be somewhat less due to the formation of chain terminating points of unsaturation during the oxyalkylation process, especially where propylene oxide is added in significant quantities.

Examples of the initiator molecule include the alkanols and low molecular weight polyols having a number average molecular weight of 500 or less, such as alkanols having an average number of carbons ranging from 1 to 32, like methanol, ethanol, propanol, butanol, and the NEODOL® alcohols commercially available from Shell Chemical Company, or water, ethylene glycol, diethylene glycol, propylene glycol, dipropylene glycol, trimethylene glycol, 1,2-butanediol, 1,5-pentanediol, 1,6-hexanediol, 1,7-heptanediol, hydroquinone, resorcinol, glycerol, 1,1,1-trimethylolpropane, 1,1,1-trimethylolethane, pentaerythritol, 1,2,6-hexanetriol, and compounds derived from phenol such as 2,2-bis(4-hydroxyphenyl)-propane, commonly known as Bisphenol A. Preferable initiator molecules include alkanols having an average number of carbons ranging from 1 to 20, trimethylolpropane, ethylene and propylene glycol, glycerine, dipropylene and diethylene glycols, and 2,2-bis(4-hydroxyphenyl)-propane and blends thereof.

Other initiators include aromatic amines such as aniline, N-alkylphenylenediamines, 2,4'-, 2,2'-, and 4,4'-methylenedianiline, 2,6- or 2,4-toluenediamine, vicinal toluenediamines, o-chloroaniline, p-phenylenediamine, 1,5-diaminonaphthalene, methylene dianiline, the various condensation products of aniline and formaldehyde, and the isomeric diaminotoluenes; and aliphatic amines such as mono-, di, and trialkanolamines, ethylene diamine, propylene diamine, diethylenetriamine, methylamine, triisopropanolamine, 1,3-diaminopropane, 1,3-diaminobutane, and 1,4-diaminobutane.

Other initiator molecules include polyhydric polythioethers, polyhydroxyl-containing phosphorus compounds, polyacetals, and aliphatic thiols.

Once the polyoxyalkylene monool or polyol is made, the molecule may be oxidized as described above to produce a polyoxyalkylene polyether polycarboxylic acid composition having compounds represented by formula I.

As noted above, the hydrophilic polycarboxylic acid composition can be produced by oxidation of a polyoxyalkylene polyether polyol by any conventional known process, including but not limited to, the processes described in U.S. Pat. Nos. 5,250,727 and 5,166,423, which disclosures are incorporated herein by reference in their entirety. Generally, oxygen is added to the polyoxyalkylene polyether polyols in the presence of a free radical (e.g., 2,2,6,6-tetramethyl-1-piperidinyloxy) and an inorganic acid (e.g., nitric acid) to produce the polyoxyalkylene polyether polycarboxylic acid composition until 80% or more of the alcohol groups are oxidized to carboxylic acid groups. The polyoxyalkylene polyether polycarboxylic acid composition can also be made by a Williamson ether synthesis where a polyoxyalkylene polyether polyol is reacted with chloroacetic acid and/or esters in the presence of a base.

Preferably, not all of the hydroxyl groups are converted to carboxylic acid groups. The degree of conversion is conducted with high selectivity toward carboxyl end groups to manufacture the polycarboxylic acid composition of the invention. Preferably, from 80%, more preferably from 85%, most preferably from 90% to no more than 99% of the hydroxyl groups in the polyoxyalkylene polyether polyol composition are converted to carboxyl end groups. The remainder of the polyoxyalkylene polyether polycarboxylic acid composition comprises species bearing unconverted hydroxyl groups and ester groups. While it is possible and even desirable to use a polyoxyalkylene polyether polycarboxylic acid composition containing 100% converted groups, as one approaches 100% conversion, the polyols and acid molecules begin to undergo chain scission.

In a preferred embodiment, the polycarboxylic acid composition contains less than 1 wt. % of aldehyde, formate, or acetal termination, and more preferably non-detectable amounts by C13 NMR analysis. In a further preferable embodiment, there is provided a polycarboxylic acid composition having an acid number of at least 5.6 mgKOH/g. In another embodiment, the polycarboxylic acid composition has an acid number ranging from 5.6 to 55 mgKOH/g, more preferably 10 to 40 mgKOH/g. At acid numbers higher than 55, the stability of water borne epoxy resin dispersion degrades and the dispersion will generally gel within a few months.

The amidoamine composition is manufactured under oligomerization reaction conditions. In one embodiment, any reaction conditions which render an amidoamine composition having oligomeric amidoamine compounds in an amount of greater than 20 wt. % and up to 80 wt. %, based on the weight of amidoamine composition, and having a structure according to Formula I wherein x>0, are suitable reaction conditions according to the invention. In another embodiment, any reaction which increases the amine nitrogen equivalent weight of the amidoamine composition by at least 10%, more preferably by at least 15%, over the average acid equivalent weight of said polyoxyalkylene polyether polyacid composition is a suitable reaction condition according to the invention.

The process of the invention is at least a two step process:

a) a condensation/water removal step comprising reacting the primary polyamine composition and the polyoxyalkylene polyether polycarboxylic acid composition under conditions effective to cause a condensation reaction between the acid composition and the polyamine composition to release water, thereby manufacturing a reaction mixture comprising amidoamine compounds, and removing at least a portion of said water from the reaction mixture; and b) an aminolysis of an amide oligomerization step comprising condensing at least a portion of the amidoamine compounds in the reaction mixture with each other to split off amines, thereby manufacturing an amidoamine composition comprising oligomeric amidoamine compounds, said oligomerization step conducted under stripping conditions to remove from the reaction mixture at least a portion of unreacted amines and the amines split from the amidoamine compounds condensed with each other.

In the first step, the primary polyamine composition and the polyoxyalkylene polyether polyacid composition are combined in a reaction vessel and reacted under condensation conditions. In this step of the reaction, the amine and acid groups are condensed to amide groups, splitting off water, thereby producing amidoamine compounds. This first step of the reaction is the condensation/water removal step. In this step, the primary polyamine compounds may or may not be completely reacted with the polyacid compounds in the polyacid composition, especially if a large excess of the primary polyamine composition is added.

In the second step, the amidoamine compounds are further condensed with each other, splitting off amine compounds. In this second step, the reaction conditions are more vigorous, requiring a stripping operation, typically under vacuum, to remove unreacted amine compounds and the amines which split off from the amidoamine-amidoamine condensation reaction. The second step of the reaction is the aminolysis of an amide oligomerization step.

The first and second steps may be discrete steps, or the first steps may overlap into the second step in a continuous fashion. Moreover, while each step has a set of reaction conditions aimed at producing a desired result, the identification of two steps does not preclude the occurrence of reactions in one step which are predominant in the other step. It is to be expected that both reaction occur in each step to a minor extent, but the reaction conditions in each step are set to produce a predominant result and product. For example, in the first step, reaction conditions are designed and established to promote the condensation of amines with acid groups, resulting in the splitting off of water which is distilled overhead. To a minor extent, however, amidoamine compounds formed in the first step may nevertheless react with other amidoamine compounds, splitting off amines and forming oligomers. The quantity of such oligomers, however, is so small as to have an insignificant effect on the final properties of the water borne epoxy dispersion. Likewise, in the second step, stringent reaction conditions are designed and established to promote oligomerization of the amidoamine compounds with each other. To some extent, however, and especially depending upon when such stringent reaction conditions are initiated, unreacted acid groups may continue to condense with amines to split off water. The designation of a first and second step reaction, as used herein, is for the convenience of labeling the reaction conditions under which a particular result is achieved.

The particular reaction conditions in the first step are not limited so long as the primary polyamine composition and polyoxyalkylene polyether polyacid composition condense. Typical reaction conditions are to heat the starting materials at temperatures ranging from 100° C. to 220° C., at atmospheric pressure, and distilling the condensation byproduct, water. Along with water, excess amine will also distill as distillate.

The length of the reaction is not particularly limited. In a preferred embodiment, the first step reaction proceeds until the acid value of the reaction mixture drops below 2 mgKOH/g, at which point the second step reaction conditions commence. In another embodiment, the first step reaction conditions may continue at least until the water content in the distillate produced during the condensation reaction drops below 15% by weight in the distillate, the remainder being amines. Preferably, at this time or thereafter, the second step reaction conditions are implemented.

In general, and in the preferable embodiments above, most reactions using primary diamines will be ready for the second step stripping conditions when the reaction mixture has been held at 200° C. or more for 10 minutes or more at about atmospheric pressure or slightly above atmospheric pressure, preferably from about 15 minutes or more.

While it is desirable to conduct the condensation reaction to substantial completion in order to provide a large number of amidoamine compounds available for oligomerization in the second step, one may optionally begin the second step reaction conditions well prior to reaction of substantially all acid groups. In this case, during the second step reaction conditions, unreacted amine is being stripped from the reaction mixture, thereby promoting the reaction between unreacted acid groups on the polyoxyalkylene polyether polycarboxylic acid composition with the terminal amine groups on the amidoamine compounds. This reaction will also promote the formation of oligomers.

Once the reaction has advanced to the desired step, the second step reaction conditions are implemented. Second step reaction conditions require intense stripping conditions. The stripping temperature, pressure, and reaction time conditions of the reaction vessel containing the primary polyamine compounds and the polyoxyalkylene polyether polycarboxylic acid composition can be adjusted to make the oligomeric amidoamine compounds in the amidoamine composition of the invention. The stripping temperature and pressure should be adjusted to strip unreacted primary polyamine compounds and any amine condensation products split off from amidoamine-amidoamine reactions in the reaction mixture (hereinafter collectively referred to as "excess amine").

The particular reaction temperature and pressure effective to strip excess amine will depend upon the boiling point of the primary polyamine compound used in the reaction vessel, as well as the nature of the polyoxyalkylene polyether polycarboxylic acid composition. It is desirable to set the temperature of the reaction vessel at about 10° C. or more, more preferably at about 15° C. or more, above the boiling point of the primary polyamine compound at the vessel pressure during reaction.

The reaction vessel is generally evacuated to subatmospheric pressure. Generally, a vessel pressure of 10 to 200 mmHg is suitable for most stripping operations. The stripping can take place at atmospheric or superatmospheric pressure, but the temperature must be raised accordingly and the stripping must be assisted by a gas such as nitrogen, raising energy costs and producing a contaminated gas stream.

The temperature and vacuum applied may be the sole means for stripping excess amines, or one may optionally assist stripping by bubbling nitrogen gas or steam through the reaction mixture. It is preferred, however, to solely apply vacuum and heat to strip the excess amines.

The stripping time is long enough to strip out substantially all excess amine from reaction mixture until little or no excess amine is stripped. It is desirable to continue stripping out excess amine until the average amine equivalent weight of the reaction mixture reaches the desired level as measured by titration.

The desired average amine equivalent weight is at least 10% higher than the acid equivalent weight of the polyoxyalkylene polyether polyacid composition, preferably at least 15% higher, more preferably at least 20% higher, and up to about 350% higher, more preferably up to about 250% higher than the acid equivalent weight of the polyoxyalkylene polyether polyacid composition.

In another embodiment, the desired amount of oligomerized amidoamine compounds ranges from at least 20 wt. % and up to 80 wt. % based on the weight of the amidoamine composition, as measured by Size Exclusion Chromatography or Gel Permeation Chromatography. It is more desirable to form at least 25 wt. %, and most preferably at least 30 wt. %, up to 80 wt. %, more commonly up to 70 wt. %, of oligomeric amidoamine compounds, based on the weight of the amidoamine composition. Oligomeric amidoamine compounds contained in the amidoamine composition in amounts ranging from at least 30 wt. % to 50 wt. % are suitable in the practice of the invention. While only 20 wt. % of amidoamine compounds are suitable, substantial increases in the efficiency of the surfactant can be experienced with an oligomeric amidoamine content above 20 wt. %. For example, we have noted that at 20 wt. % oligomeric amidoamine compounds, the water borne epoxy dispersion required only 6.1 wt. % of an epoxidized amidoamine surfactant to disperse solids to a particle size of 0.6 μm, while an amidoamine composition containing about 30 wt. % oligomeric amidoamine compounds required only 5.5 wt. % of the epoxidized amidoamine surfactant to disperse the same fraction of solids at the same particle size in water. This reduction in surfactant level translates to a reduction in costs and improved shelf stability for the water borne epoxy resin dispersion.

The shelf stability of the water borne epoxy resin of the invention is improved because the pH of the dispersion is reduced. The pH of the water borne dispersion is preferably less than 9.5. We have achieved this reduction in pH by virtue of using oligomeric amidoamine compounds in the amidoamine surfactant composition. The cumulative effect of having the ability to lower the amount of amidoamine surfactant composition required to disperse epoxy resins in water due to the greater efficiency of the amidoamine surfactant composition of the invention, and the reduction in the number of overall active nitrogen groups (excluding amide nitrogens) present in the amidoamine surfactant composition leads to the observed reduction in the pH of the water borne dispersion.

As noted above, a suitable polyoxyalkylene polyether polycarboxylic acid composition has a number average molecular weight within the range of from about 2000, preferably from about 3000, more preferably from about 4000, to about 10,000, preferably to about 8,000, more typically to about 6,000. Above 10,000, the emulsion in water is too viscous, and below 2,000, the amidoamine prosurfactant makes a surfactant composition which has an HLB too low for good dispersion efficiency. The number of active amine sites, however, can be reduced by using a polyoxyalkylene polyether polycarboxylic acid composition having a number average molecular weight within the range of from about 3000, preferably at least 4000, and in view of optimizing the viscosity of the emulsion, preferably up to about 8000, more preferably up to about 6000.

The equivalent ratio of primary polyamine compounds to polyoxyalkylene polyether polycarboxylic acid compounds is at least 4.0 amine equivalents to 1 acid equivalent, preferably at least 5.0 amine equivalents to 1 acid equivalent, and more typically is at least 6 amine equivalents to 1 acid equivalent. In addition to the intensity and duration of the stripping process, the amine to acid ratio of starting materials can also be varied to achieve a desired amidoamine composition average amine equivalent weight. It is desirable to continue reacting the amidoamine compounds with each other during stripping to build up the molecular weight of the amidoamine composition to achieve an average amine equivalent weight, as noted above, of at least 10% higher than the acid equivalent weight of the polyoxyalkylene polyether polyacid composition.

In general, the average amine equivalent weight of the amidoamine composition suitably ranges from 1100 or more, more preferably 1,650 or more, most preferably 2,200 or more, and up to about 10,000, more preferably up to about 8,000, most preferably up to about 6000.

As used throughout, an amine equivalent weight means titratable nitrogen equivalent weight.

Once the stripping process is complete, the temperature of the reaction mixture is lowered, stripping is discontinued, and water is added to make a solution of the amidoamine composition. If desired, a capping agent can be added to the amidoamine solution in order to convert the primary amine groups to secondary amine groups. Suitable amounts of capping agent added to the amidoamine solution can range from more than 1 equivalent amine to 1 equivalent of capping agent, more preferably at least 1.2 amine equivalents to 1 equivalent of capping agent, most preferably at least 1.3 equivalents amine to 1 equivalent of capping agent. It is desirable to only partially cap the amidoamine composition, and even a partial capping will have a beneficial effect on the stability on the EEW of the dispersion.

Non-limiting examples of monoepoxy capping agents which are suitable for use in the invention include:

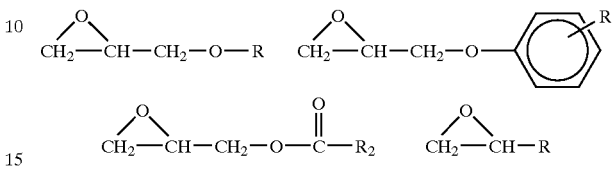

wherein R and $R^2$ are the same or different and are a branched or linear alkyl, cycloalkyl, polyoxyalkyl, or alkenyl group having 2–100 carbon atoms, optionally branched; and $R_1$ is hydrogen or a branched or unbranched alkyl having 1–18 carbon atoms. There may be more than one type of $R_1$ group attached to the aromatic ring.

These categories would include the unsaturated epoxy hydrocarbons of butylene oxide, cyclohexene oxide, styrene oxide and the like; glycidyl ethers of monovalent alcohols such as methyl, ethyl, butyl, 2-ethylhexyl, dodecyl alcohol and others; glycidyl ethers of the alkylene oxide adducts of alcohols having at least 8 carbon atoms by the sequential addition of alkylene oxide to the corresponding alkanol (ROH), such as those marketed under the Neodol® name; glycidyl ethers of monovalent phenols such as phenol, cresol, and other phenols substituted in the o- or p-positions with $C_1$–$C_{21}$ branched or unbranched alkyl. aralkyl, alkaryl, or alkoxy groups such as nonylphenol; glycidyl esters of mono-carboxylic acids such as the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454, hereby incorporated by reference; glycidyl esters of unsaturated alcohols or unsaturated carboxylic acids such as the glycidyl ester of neodecanoic acid; epoxidized methyl oleate, epoxidized n-butyl oleate, epoxidized methyl palmitoleate, epoxidized ethyl linoleate and the like; allyl glycidyl ether, and acetals of glycidaldehyde.

Specific examples of monoglycidyl capping agents useful to the practice of the invention include alkyl glycidyl ethers with 1–18 linear carbon atoms in the alkyl chain such as butyl glycidyl ether or a mixture of $C_8$–$C_{14}$ alkyls, cresyl glycidyl ether, phenyl glycidyl ether, nonylphenylglycidyl ether, p-tert-butylphenyl glycidyl ether, 2-ethylhexyl glycidyl ether, and the glycidyl ester of neodecanoic acid.

The aliphatic based capping agents are usually hydrophobic in character, which tends to improve the coalescence properties of the epoxy-curing agent mixture at low temperatures, and tends to lower the glass transition temperature of the film or coating. The lower glass transition temperature improves the impact strength of the cured film. Aromatic based monoglycidyl capping agents, however, have the advantage of rendering the cured film more rigid, chemically resistant, and resistant to stresses at high temperatures. Any one of these types of capping agents may be used, and mixtures thereof are also advantageous to attain an overall balance of mechanical strength and chemical resistance.

The reaction temperature between the amidoamine composition and the optional addition of the capping agent is not limited. Suitable reaction temperatures range from 60° C. to 150° C.

Once the amidoamine composition is manufactured, the epoxy functional surfactant is made by reacting the optionally end capped amidoamine composition with an epoxy resin having a functionality greater than 0.8 epoxide group per molecule.

The amidoamine is contacted with the epoxy resin under conditions effective to react the amine group and the epoxide group. Typically, the equivalent weight ratio of epoxy to amine is at least 2:1, preferably in the range of from 6:1 to 500:1, more preferably in the range of from 6:1 to 30:1. The reaction is typically carried out at a temperature from ambient temperature to an elevated temperature sufficient to react the amine groups and the epoxide groups, preferably in the range of from 50° C. to 150° C. for a time effective to produce the reaction products. The progress of the reaction can be monitored and targeted to produce the desired product by measuring the amine equivalent weight and the epoxy equivalent weight of the reaction mixture. Generally, the reaction mixture is heated until the epoxy equivalents equal to the amine equivalents added are consumed, which is generally one hour or greater.

More than one epoxy resin can be reacted with the amidoamine. For example, the amidoamine composition can be reacted first with the capping agent (a monoepoxide resin) as noted above, and then with a diepoxy resin. Alternatively, the capping agent and a multifunctional epoxy resin (nominal functionality of 2 or more) can be combined and reacted with the amidoamine composition. In another example, the amidoamine composition can be reacted with a novolac epoxy resin and a diepoxy resin stepwise or at the same time in any order.

If desired the epoxy functional surfactant can be recovered from the reaction mixture or made "in-situ." To provide the epoxy functional surfactant in-situ in the desired epoxy resin component, the amidoamine composition can be reacted into the desired epoxy resin component. The in-situ method is a preferred method for providing an epoxy-functional amidoamine surfactant where the residue of the epoxy resin (hydrophobic moiety) which was reacted with the amidoamine is the same as the bulk epoxy resin that is dispersed with the epoxy functional surfactant.

For the in-situ method, the epoxy resin should be present in an amount sufficient to provide unreacted epoxy resin component and the epoxy functional surfactant adduct. Further, to provide the surfactant in-situ in an advanced epoxy resin, the amidoamine composition can be reacted into the mixtures of diepoxy resins, such as diglycidyl ethers of dihydric phenols, with dihydric phenols during the advancement reaction or can be reacted into the resin after the advancement reaction. In an advancement reaction, generally the diepoxy resin and the dihydric phenol are allowed to react in a molar ratio of 7.5:1 to 1.1:1 in the presence of an advancement catalyst, producing an advanced epoxy resin having a weight per epoxy value of from 225 to 3,500. Typically, 0.1 to 15 weight percent of the amidoamine composition, based on epoxy resin or epoxy resin and phenolic compound, is used. It is preferred to add the amidoamine composition after the advancement reaction, whether the advanced products are separated or provided as is.

The epoxy resins used in producing the epoxy functional surfactant, and which can be used as the epoxy resin to be dispersed, can be any reactive epoxy resin having an epoxy equivalency (functionality) greater than 0.8 epoxide group per molecule, and in some applications, preferably at least 1.5 to about 6.5 epoxide groups per molecule. The epoxy resin can be saturated or unsaturated, linear or branched, aliphatic, cycloaliphatic, aromatic or heterocyclic, and may bear substituents which do not materially interfere with the reaction with the amidoamine surfactant. Such substituents can include bromine or fluorine. The epoxy resin may be monomeric or polymeric, liquid or solid, but is preferably liquid or a low melting solid at room temperature. Suitable epoxy resins include glycidyl ethers prepared by reacting epichlorohydrin with a compound containing at least 1.5 aromatic hydroxyl groups carried out under alkaline reaction conditions. Examples of other epoxy resins suitable for use in the invention include monoepoxies, diglycidyl ethers of dihydric compounds, epoxy novolacs, cycloaliphatic epoxies, polyglycidyl esters of polycarboxylic acids, and glycidyl methacrylate-containing acrylic resins.

Generally epoxy resins contain a distribution of compounds with a varying number of repeat units. Further, the epoxy resin can be a mixture of epoxy resins. In one such embodiment, the epoxy resin can comprise a monoepoxide resin and a di- and/or a multifunctional epoxy resin, preferably an epoxy resin having a functionality of from 0.7 to 1.3 and an epoxy resin having a functionality of at least about 1.5, preferably at least 1.7, more preferably from 1.8 to 2.5. The mixture can be added or reacted with the amidoamine stepwise or simultaneously.

Preferred epoxy resins include, but are not limited to, those represented by the formula:

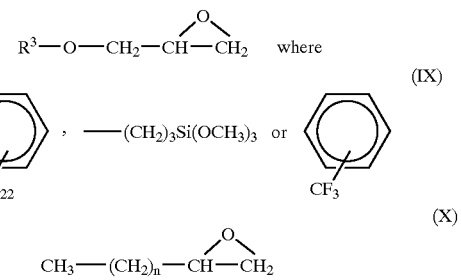

(IX)

(X)

wherein n=5–20.

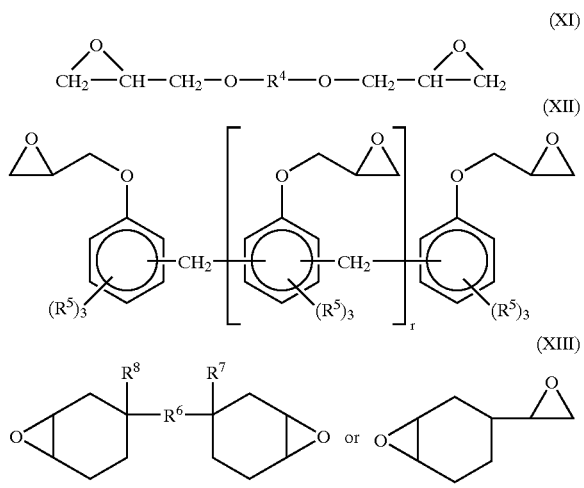

(XI)

(XII)

(XIII)

wherein r is a real number from 0 to 6, $R^3$ is a linear or branched $C_1$–$C_{22}$ alkyl group, an arylalkyl group, an alkylsilane or a halogenated aryl or alkyl group, $R^4$ is divalent aliphatic, divalent cycloaliphatic, divalent aryl, or divalent arylaliphatic group, preferably $R^4$ contains 8 to 120 carbon atoms, $R^5$ is independently a hydrogen atom or a $C_1$–$C_{10}$ alkyl group, $R^6$ is a divalent aliphatic group optionally containing ether or ester group(s) or which together with $R^7$ or $R^8$ forms a spiro ring optionally containing heteroatoms, and $R^7$ and $R^8$ are independently hydrogen or $R^7$ or $R^8$ together with $R^6$ form a spiro ring optionally containing heteroatoms such as oxygen, preferably $R^6$ contains 1 to 20 carbon atoms. The term aliphatic or cycloaliphatic includes compounds having oxygen and/or sulfur atoms in or on the backbone. For example, $R^4$ can be a divalent cycloaliphatic group having the formula

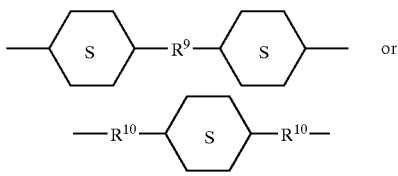

wherein $R^9$ and $R^{10}$ are each independently an alkylene group, or a divalent arylaliphatic group having the formula

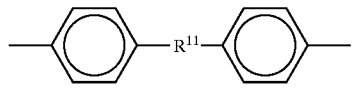

wherein $R^{11}$ is an alkylene group.

Preferably the epoxy resin is a difunctional epoxy resin such as a diglycidyl ether of a dihydric phenol, a diglycidyl ether of a hydrogenated dihydric phenol, an aliphatic glycidyl ether, epoxy novolac or a cycloaliphatic epoxy.

Diglycidyl ethers of dihydric phenols can be produced, for example, by reacting an epihalohydrin with a dihydric phenol in the presence of an alkali. Examples of suitable dihydric phenols include: 2,2-bis(4-hydroxyphenyl) propane (bisphenol-A); 2,2-bis(4-hydroxy-3-tert-butylphenyl) propane; 1,1-bis(4-hydroxyphenyl)ethane; 1,1-bis(4-hydroxyphenyl) isobutane; bis(2-hydroxy-1-naphthyl) methane; 1,5-dihydroxynaphthalene; 1,1-bis(4-hydroxy-3-alkylphenyl) ethane and the like. Suitable dihydric phenols can also be obtained from the reaction of phenol with aldehydes such as formaldehyde (bisphenol-F). Diglycidyl ethers of dihydric phenols include advancement products of the above diglycidyl ethers of dihydric phenols with dihydric phenols such as bisphenol-A, such as those described in U.S. Pat. Nos. 3,477,990 and 4,734,468, which are herein incorporated by reference.

Diglycidyl ethers of hydrogenated dihydric phenols can be produced, for example, by hydrogenation of dihydric phenols followed by a glycidation reaction with an epihalohydrin in the presence of a Lewis acid catalyst and subsequent formation of the glycidyl ether by reaction with sodium hydroxide. Examples of suitable dihydric phenols are listed above.

Aliphatic glycidyl ethers can be produced, for example, by reacting an epihalohydrin with an aliphatic diol in the presence of a Lewis acid catalyst followed by conversion of the halohydrin intermediate to the glycidyl ether by reaction with sodium hydroxide. Examples of preferred aliphatic glycidyl ethers include those corresponding to the formulas:

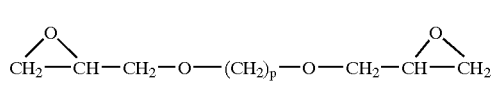
(XIV)

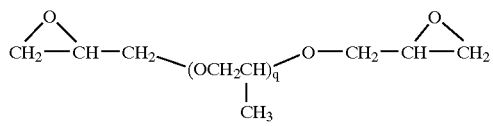
(XV)

wherein:
p is an integer from 2 to 12, preferably from 2 to 6; and
q is an integer from 4 to 24, preferably from 4 to 12.

Examples of suitable aliphatic glycidyl ethers include for example, diglycidyl ethers of 1,4 butanediol, neopentyl glycol, cyclohexanedimethanol, hexanediol, polypropylene glycol, and like diols and glycols; and triglycidyl ethers of trimethylol ethane and trimethylol propane.

Examples of suitable monoepoxies include those mentioned above, and the glycidated monoacids and epoxides formed from alpha olefins and glycidoxyalkylalkoxysilanes.

Epoxy novolacs can be produced by condensation of formaldehyde and a phenol followed by glycidation by reaction with an epihalohydrin in the presence of an alkali. The phenol can be for example, phenol, cresol, nonylphenol and t-butylphenol. Examples of the preferred epoxy novolacs include those corresponding to the formula:

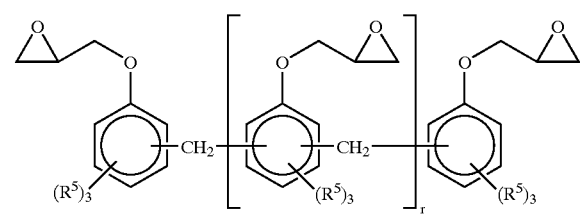
(XII)

wherein $R^5$ is independently a hydrogen or a $C_1$–$C_{10}$ alkyl group and r is a real number from 0 to 6. Epoxy novolacs generally contain a distribution of compounds with a varying number of glycidated phenoxymethylene units, r. Generally, the quoted number of units is the number closest to the statistical average, and the peak of the distribution.

Cycloaliphatic epoxies can be produced by epoxidizing a cycloalkene-containing compound with more than one olefinic bond with peracetic acid. Examples of the preferred cycloaliphatic epoxies include those corresponding to the formulas:

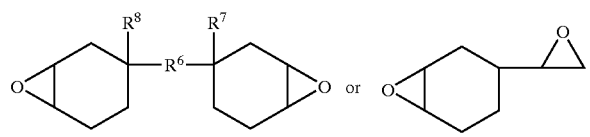
(XIII)

wherein $R^6$ is a divalent aliphatic group optionally containing ether or ester group(s) or together with $R^7$ or $R^8$ form a spiro ring optionally containing heteroatoms, and $R^9$ and $R^{10}$ are independently hydrogen or $R^7$ or $R^8$ together with $R^6$ form a spiro ring optionally containing heteroatoms such as oxygen. Preferably $R^6$ contains from 1 to 20 carbon atoms. Examples of cycloaliphatic epoxies include, for example, 3,4-epoxycyclohexylmethyl-(3,4-epoxy)cyclohexane carboxylate, the diepoxy spirodiacetal produced by condensation of 2 moles of 4-cyclohexenecarboxaldehyde with pentaerythritol followed by epoxidation of the double bonds, bis(3,4-epoxycyclohexylmethyl)adipate, bis(3,4-epoxycyclohexyl)adipate and vinylcyclohexene dioxide [4-(1,2-epoxyethyl)-1,2-epoxycyclohexane]. Cycloaliphatic epoxies include compounds of the formulas:

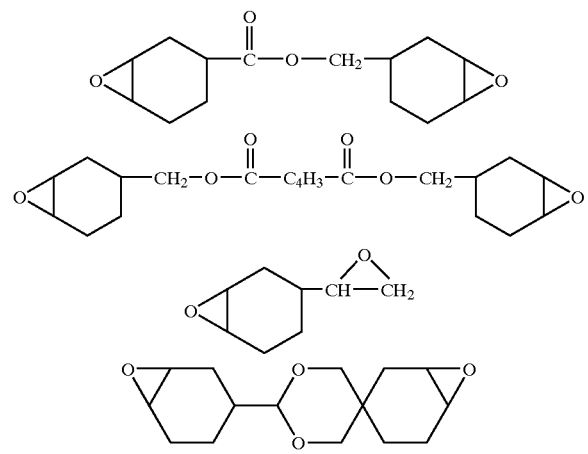

Commercial examples of preferred epoxy resins include, for example, EPON® Resins DPL-862, 828, 826, 825, 1001, 1002, EPONEX® Resin 1510, HELOXY® Modifiers 32, 62, 63, 64, 65, 67, 68, 71, 107, 116, EPON® Resin DPS155, EPON® Resin HPT 1050 and CARDURA® Resin E-10 all available from Resolution Performance Products and Union Carbide Epoxy Resins ERL-4221, -4289, -4299, -4234 and -4206.

Aqueous Epoxy Resin Dispersions

In a typical aqueous dispersion of the invention useful for coating applications, the amount of the epoxy resin component, which includes the epoxy functional surfactant, (also known as the solids content or non-volatile content) is from 20 to 75 percent by weight, preferably from 55 to 65 percent by weight, based on the total dispersion. Generally, a) water and b) an epoxy resin having a functionality of greater than 0.8 epoxide group per molecule are mixed under conditions effective to provide an oil-in-water emulsion in the presence of c) an epoxy-functional surfactant mentioned above in an amount ranging 1 wt % to 10 wt %, preferably 2 wt % to 7 wt %, more preferably only 2 wt % to less than 6.0 wt %, most preferably from 2 wt. % to less than 5.0 wt. %, based on the weight of solids. Given that the efficiency of the epoxy functional surfactant of the invention is increased, the amount required to disperse the epoxy resin is reduced. Accordingly, preferably amounts of epoxy functional surfactant range from as little as 2 to less than 6.0 wt. %.

Identifying the b) epoxy resin separately from the c) epoxy functional surfactant is for convenience only since the c) epoxy functional surfactant can be, if one chooses, made in situ in the b) epoxy resin. These dispersions can be made by adding the surfactant and water to the epoxy resin to be dispersed or by producing the surfactant "in-situ" as described above. These dispersions can also be made by adding the epoxy resin to the amidoamine composition and water.

One or more epoxy-functional amidoamine surfactants can be used. Optionally, a co-surfactant can be used along with the epoxy functional surfactant. Optionally, the dispersion also contains acetone. More preferably, the dispersion contains acetone and at least one non-volatile hydrophobic liquid resin or resin modifier. Acetone is preferably present in an amount from 0, if present preferably from 0.5, more preferably in an amount of 1, up to preferably 5, more preferably up to 3% of the total aqueous dispersion.

It has been found that the invention provides a stable aqueous dispersion having an average particle size of preferably less than 1.00 μm, preferably 0.55 μm or less, more preferably 0.50 μm or less.

The epoxy resin coating composition of the invention may include other additives, such as elastomers, stabilizers, extenders, plasticizers, pigments, pigment pastes, antioxidants, leveling or thickening agents, defoaming agents and/or cosolvents, wetting agents, cosurfactants, reactive diluents, fillers, catalysts, and the like. The aqueous dispersion can contain a monoepoxide diluent as reactive diluent.

The reactive diluent can be any non-volatile, hydrophobic compound which is liquid and flowable at room temperature, whether neat or in a hydrophobic solvent such as xylene or butanol. A substance is non-volatile when it meets the definition according to ASTM D 2369-93 or ASTM D 3960-93. For a coating composition, the reactive diluent (also known as a hydrophobic liquid resin or resin modifier) must be compatible (e.g. does not detract from corrosion resistance, or high gloss, etc.) with the curing agents in the coating composition, for example, such as amine curing agents. Preferable reactive diluents include, for example, aliphatic monoglycidyl ethers, urea formaldehyde resins or aliphatic monoglycidyl esters. Preferable monoepoxide diluents are those which contain a water-immiscible glycidated $C_{8-20}$ aliphatic alcohol, $C_{1-18}$ alkylphenol glycidyl ether, or glycidated tertiary carboxylic acid. The monoepoxide component can contain alicyclic and aromatic structures, as well as halogen, sulfur, phosphorus, and other such heteroatoms. Reactive diluents can be, for example, epoxidized unsaturated hydrocarbons such as decene and cyclohexene; glycidyl ethers of monohydric alcohols such as 2-ethylhexanol, dodecanol and eicosanol; glycidyl esters of monocarboxylic acids such as hexanoic acid; acetals of glycidaldehyde; and the like. The preferred reactive diluent is the glycidyl ether of monohydric $C_{8-14}$ aliphatic alcohols. Reactive diluents are commercially available as HELOXY® 7 Modifier ($C_8$–$C_{10}$ alkyl glycidyl ether), HELOXY® 9 Modifier ($C_{10-11}$alkyl glycidyl ether) from Resolution Performance Products and BEETLE® 216-10 Resin (alkylated urea formaldehyde high solids solution from Cytec Industries Inc).

The reactive diluent is preferably present in an amount from 0, if present preferably in an amount from 1, to 10, preferably to 25%, based on the total amount of components b), c), and d)ii).

Useful coating compositions can be obtained by mixing an amine-functional epoxy resin curing agent with the aqueous epoxy resin dispersion mentioned above.

Curing Agent

The epoxy resin curing agent can be any curing agent effective to cure (or crosslink) the epoxy resin dispersed in the aqueous solution. These curing agents are generally water compatible (i.e., dilutable and/or dispersable). Suitable curing agents for use with the dispersions include those typically employed with epoxy resins, such as aliphatic, araliphatic and aromatic amines, polyamides, amidoamines and epoxy-amine adducts. They exhibit varying levels of compatibility with water, depending upon the nature of the starting materials employed for their preparation. In many cases, partial ionization with acetic acid, propionic acid and the like is required to effect or improve water compatibility or emulsifiability.

Preferably, for curing at room temperature of lower temperatures an epoxide equivalent to amine hydrogen equivalent ratio of from 1:0.75 to 1:1.5 are generally employed. Suitable polyalkylene amine curing agents are those which are soluble or dispersible in water and which contain more than 2 active hydrogen atoms per molecule such as diethylenetriamine, triethylenetetramine, tetraethylenepentamine, etc. Other suitable curing agents include, for example, 2,2,4- and/or 2,4,4-trimethylhexamethylenediamine, 1,6-hexanediamine, 1-ethyl-1,3-propanediamine, 2,2(4),4-trimethyl-1,6-hexanediamine, bis(3-aminopropyl)piperazine, N-aminoethylpiperazine, N,N-bis(3-aminopropyl) ethylenediamine, 2,4(6)-toluenediamine and also cycloaliphatic amines such as 1,2-diaminocyclohexane, 1,4-diamino-2,5-diethylcyclohexane, 1,2-diamino-4-ethylcyclohexane, 1,4-diamino-2,5-diethylcyclo-hexane, 1,2-diamino-4-cyclohexylcyclohexane, isophoronediamine, norbornanediamine, 4,4'-diaminodicyclohexylmethane, 4,4'-diaminodicyclohexylethane, 4,4'-diaminodicyclohexylpropane, 2,2-bis(4-aminocyclohexyl) propane, 3,3'-dimethyl-4,4'-diaminodicyclohexylmethane, 3-amino-1-(4-aminocyclohexyl)propane, 1,3- and 1,4-bis (aminomethyl)cyclohexane. As araliphatic amines, in particular those amines are employed in which the amino groups are present on the aliphatic radical for example m- and p-xylylenediamine or their hydrogenation products. The amines may be used alone or as mixtures.

Suitable amine-epoxide adducts are, for example, reaction products of diamines such as, for example, ethylenediamine, diethylenetriamine, triethylenetetramine, m-xylylenediamine and/or bis(aminomethyl)cyclohexane with terminal epoxides such as, for example, polyglycidyl ethers of polyhydric phenols listed above.

Polyamidoamine curing agents can be obtained, for example by reacting polyamines with polycarboxylic acids such as dimerized fatty acids. In addition to the above polyamines, the water-soluble polyoxypropylenediamines with molecular weights of 190 to 2,000 and also the readily water-dispersible curing agents, such as are described in the German Auslegeschrift 2,332,177 and the European Patent 0,000,605, for example, modified amine adducts are preferably employed. To cure the coating to completion, the coatings obtainable from these dispersions may also be heated for 30 to 120 minutes at an elevated temperature, preferably within the range of 50° C. to 120° C.

For higher temperature cure applications, aminoplast resins can be used as curing agents for epoxy resins having a high equivalent weight, e.g. greater than 700. Generally, from 5, preferably from 10, to 40, preferably to 30 weight percent of aminoplast resins, based on the combined weight of the epoxy resin and aminoplast resin, is used. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Examples of aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxy-methylol urea, butylated polymeric urea-formaldehyde resins, hexamethoxymethyl melamine, methylated polymeric melamine-formaldehyde resins and butylated polymeric melamine-formaldehyde resins.

Commercial examples of water-compatible curing agents include EPI-CURE® 8535, 8536, 8537, 8290 and 8292 Curing Agents (available from Resolution Performance Products), ANQUAMINE 401, Casamid 360 and 362 curing agents (Air Products); EPILINK 381 and DP660 curing agents (Akzo Chemical Co.); Hardener HZ350, Hardeners 92-113 and 92-116 (Vantico); BECKOPOX EH659W, EH623W, VEH2133W curing agents (Solutia) and EPOTUF 37-680 and 37-681 curing agents (Reichhold Chemical Co.).

The curable epoxy resin composition can be cured at a temperature within the range of from 5° C., preferably from 20° C., to 200° C., preferably to 175° C. for a time effective to cure the epoxy resin.

The aqueous dispersions of the instant invention and curing agents described above can serve as components of paints and coatings for application to substrates such as, for example, metal and cementitious structures. To prepare such paints and coatings, these resins are blended with primary, extender and anti-corrosive pigments, and optionally, additives such as surfactants, antifoam agents, rheology modifiers and mar and slip reagents. The selection and amount of these pigments and additives depends on the intended application of the paint and is generally recognized by those skilled in the art.

Examples of primary pigments include rutile titanium dioxide, such as KRONOS® 2160(Kronos, Inc.) and TI-Pure® R-960 from Du Pont, buff titanium dioxide, red iron oxide, yellow iron oxide and carbon black. Examples of extender pigments include calcium metasilicate, such as 10ES WOLLASTOKUP®(NYCO Minerals, Inc.), barium sulfate, such as SPARMITE®(Harcros Pigments, Inc.) and aluminum silicate, such as ASP®170(Englehard Corp.). Examples of anticorrosive pigments include calcium strontium phosphosilicate, such as HALOX SW111(Halox Pigments), zinc ion modified aluminum triphosphate, such as K-WHITE®84(Tayca Corp.) and basic aluminum zinc phosphate hydrate, such as HEUCOPHOS®ZPA (Heuco Tech, Ltd.).

Additional surfactants can be included in waterborne epoxy paints and coatings to improve both pigment and substrate wetting. Such surfactants are typically non-ionic, examples of which include TRITON® X-100 and TRITON X405(Union Carbide), PLURONIC F-88 (BASF) and SURFYNOL® 104(Air Products and Chemicals).

Anti-foam agents and defoamers suppress foam generation during manufacture of the paint or coating. Useful defoamers include DREWPLUS®L-475(Drew Industrial Div.), DEE FO®PF-4 Concentrate (Ultra Additives) and BYK®033 (BYK-Chemie).

Rheological additives are employed to obtain proper application properties. There are three types of additives that provide the desired thickening and shear thinning required for waterborne epoxy coatings; namely, hydroxyethylcellulose, organically modified hectorite clays and associative thickeners. NATROSOL®250 MBR and NATROSOL Plus (Aqualon) are examples of modified hydroxyethyl-cellulosics and BENTONE®LT (RHEOX, Inc.) is representative of a hectorite clay. Optiflo® (Sud-Chemie) is a useful associative thickener.

Mar and slip agents improve early resistance to abrasion from scrubbing or light foot traffic. Polydimethylsiloxanes and polyethylene waxes are used in this regard. An example of a commercially available wax slip agent is MICHEM LUBE®182(MICHELMAN, INC.)

The curable paint and coating compositions can be applied to a substrate by brush, spray, or rollers.

The aqueous dispersions of the instant invention can also be used as components of adhesives and fiber sizing.

Illustrative Embodiments

The following illustrative embodiments describe the process of the invention and are provided for illustrative purposes and are not meant as limiting the invention.

EPON® Resin 828 (a diglycidyl ether of dihydric phenol having epoxy equivalent weight of 187–188; HELOXY® Modifier 8 (the glycidyl ether of a mixture of $C_{12}$–$C_{14}$ linear alcohols; and CARDURA® E-10, a glycidyl ester of a $C_{10}$ tertiary carboxylic acid, were obtained from Resolution Performance Products. Polyoxyethylene polyether glycol was obtained from Union Carbide or Aldrich Chemical Co. 2-methyl-1,5-pentanediamine (Dytek A) was obtained from DuPont.

Testing Methods

Viscosity Viscosities were determined on the obtained emulsion or dispersion by means of a Brookfield Synchro Lectric Viscometer from Brookfield Engineering Laboratories.

Particle Size The determination of emulsion and dispersion surface area average particle sizes was accomplished with a Beckman-Coulter LS230 analyzer. The number average and weight average paricle sizes were determined with a Brookhaven Bi-DCP Particle Sizer from Brookhaven Instruments Corporation. Dn is number average particle size and Dw is mass (weight) average particle size. All particle size data is reported in mircometers which is the same as microns.

Percent Solids The percent solids of all products was measured by spreading a 0.5 gram sample of the product onto aluminum foil, placing the coated foil into a forced draft oven, held at 120° C., for 10 minutes, determining the residual weight of the film by ratioing the residual weight to the total weight and multiplying by 100.

Weight per Epoxide The weight per epoxide (WPE or EEW) of all products was determined by drying a weighed amount of sample by means of azeotropic distillation with methylene chloride then titrating the residue by known methods and correcting for percent solids to determine the WPE at 100% solids content. Alternatively they can be titrated wet with reagents using a 50/50 blend of acetic acid and propylene carbonate to completely solubilize the dispersions.

EXAMPLE 1

Preparation of an Amidoamine Composition According to the Invention

To a stainless steel reactor with a capacity of approximately 1150 liters were added 601.5 Kg of polyoxyethylene polyether glycol 4600 and 45.4 Kg of water. The mixture was heated to 60° C. and stirred overnight to dissolve the PEG. The following morning, 5.41 Kg of 4-hydroxy-2,2,6,6,tetramethylpiperidine-1-oxyl free radical (4-hydroxy TEMPO) and a mixture of 7.14 Kg of 67% nitric acid and 21.9 Kg of water were charged to the reactor with stirring. The reactor vent was then closed and oxygen was added to the reactor from a 1A cylinder with a regulator. Sufficient oxygen was added to bring and keep the reactor to an oxygen pressure of 25 psig (172 kPa) in addition to the air which was in the reactor before oxygen addition. The reactor was kept at 57–63° C. with stirring for 4 hours as additional oxygen was added from the cylinder through a regulator set to keep the added oxygen pressure at 172 kPa. At this point, the cylinder pressure had dropped by 1975 psig (13.62 MPa), indicating that 8.38 Kg of oxygen had been transferred from the cylinder to the reactor. The oxygen cylinder regulator was then turned off and the reaction was continued for two additional hours at this temperature with stirring in order to consume most of the oxygen in the headspace of the reactor.

At the end of this time the pressure of added oxygen in the reactor headspace had dropped to 9.6 psig (66 kPa) and the rate of oxygen consumption had become very slow. The remaining oxygen was vented and vacuum was applied to the reactor to bring the absolute pressure down to 13.5 kPa. The reactor temperature was increased to 93° C. to distill the water and remaining nitric acid into the overhead accumulator. Distillation was continued for 1.5 hours. Vacuum was broken to sample the product for acid equivalent weight. The acid equivalent weight was 2382, corresponding to 93% oxidation of the alcohol end groups. The overhead accumulator was drained.

The reactor contents were then cooled to 68° C. and 123.1 Kg of 2-methyl-1,5-pentanediamine (Du Pont Dytek A) were then charged to the reactor. The reactor temperature was raised to 202° C. over a period of 2.5 hours as a mixture of water and some of the diamine was allowed to distill at atmospheric pressure. When the reactor contents had reached this temperature, the overhead accumulator was drained and vacuum was applied to strip the remaining diamine. After 2.75 hours, the reactor pressure was 3 kPa, the temperature was 209° C. and a nitrogen sparge was applied to promote the stripping of excess diamine. Stripping was continued for 4.5 additional hours with vacuum and nitrogen. Vacuum was broken and the reactor contents were sampled; the amine equivalent weight was 2905.

The reactor was then cooled to 104° C. and charged with 317.6 Kg of water to dissolve the product, followed by 38.1 Kg of CARDURA® E-10 (a glycidyl ester of a $C_{10}$ tertiary carboxylic acid). The mixture was stirred at 93° C. for one hour to react the epoxy groups of the CARDURA E-10 with the amine groups of the oxidized polyoxyethylene polyether glycol-diamine condensate. Solids content was measured and 63.5 Kg of additional water was added to adjust solids concentration to the desired level. The product was loaded out into drums.

The final product had a solids concentration of 63.7% and an amine equivalent weight of 3281 (solids basis). Gel permeation (size exclusion) chromatography of the product (polyoxyethylene polyether glycol calibration) showed a low molecular weight peak at a peak molecular weight of 4590 (64.2% of area) and a high molecular weight peak at a peak molecular weight of 9268 (31.4% of area, probably corresponding to coupled material). Remaining area corresponded to material of a few hundred molecular weight. No particular broadening of the lower molecular weight peak into the low molecular weight region, corresponding to chain scission, was observed. The total mixture had a number average molecular weight of 3758 and a weight average molecular weight of 6260. The percentage of oligomeric amidoamine compounds present in the amidoamine composition was 31.4% based on GPC.

EXAMPLE 2

In-situ Epoxy Resin Reaction with the Polyamidoamine Composition of Example 1, and the Water Borne Dispersions Thereof To a flask equipped with a mechanical stirrer and heating mantle were added 534.15 grams of EPON® Resin 828, 163.35 grams of bisphenol A, and 0.6 grams of triphenylphosphine. The batch was heated to 130° C. When the components were homogeneous at 130°C., the pressure was adjusted to atmospheric but the nitrogen purge was maintained. The reactants were allowed to exotherm to 204° C. The heating mantle was removed and the mixture was allowed to cool to between 149–188° C. for one hour. The epoxide equivalent weight of the mixture was determined and was found to be 490, indicating satisfactory completion of the fusion reaction.

The reaction mixture was cooled to 171° C. and 60 grams of 1-methoxy-2-propanol diluent were added. The reaction mixture was further cooled to 104° C. and 27.4 grams of water were added, followed by 75 grams of the aqueous polyamidoamine surfactant solution prepared in Example 1. The mixture was then held for 1 hour at 99° C. with stirring to prepare the dispersion, followed by addition of 83.7 grams of water. The mixture was then cooled to 60° C. and stirred for 45 minutes. It was then cooled to 49° C. and stirred for 3 hours. A sample was taken at this point for particle size determination. Then were added 15 grams of HELOXY® Modifier 8 monoepoxide followed by 28.95 grams of acetone. The mixture was then stirred for 30 minutes at 46° C. and sampled for particle size. Stirring was continued at 46° C. for an additional hour followed by sampling for particle size again. Then were added 475.6 grams of water over a 1-hour period at 46–48° C. with stirring, followed by 1.5 hours of additional stirring at this temperature.

The calculated amount of capped polyamidoamine composition used to make the surfactant to disperse the epoxy resin in water is 6.3%, based on the weight of solids. The final product had a solids content of 52.5%, an epoxy equivalent weight of 519, and a 25° C. Brookfield viscosity of 1660 cps (spindle #5, 20 rpm). Number average particle diameter was 0.518 micrometer and weight average particle diameter was 0.67 micrometer. The pH of the batch after one month at 75° F. is reported below in Table 1.

EXAMPLE 3

In-situ Epoxy Resin Reaction with the Polyamidoamine Composition of Example 1, and the Water Borne Dispersions Thereof To a standard resin flask reactor were added 534.15 grams EPON® Resin 828, 163.35 grams Bisphenol A and 0.6 grams triphenylphosphine. As the batch was heated to 132° C. the reactor was purged with $N_2$ under reduced pressure to deaerate and reduce moisture level in the components. The mixer was set at 100 rpm and the pressure was set at 17 inches Hg. When the components were homogeneous at 132° C. pressure was adjusted to atmospheric but the $N_2$ purge was maintained. The reactants were allowed to exotherm to 205° C. The reactants were allowed to cool to 187° C. and maintained at that temperature for one hour. At the end of the hour the epoxy equivalent weight was measured to be 492. The reactants were allowed to cool to 176° C. and were slowly diluted, under reflux, with 60 grams of propylene glycol monomethyl ether. The batch was allowed to cool to 114° C., the agitation was stopped and the reactant solution was allowed to stand overnight.

The next morning the reactant solution was reheated to 82° C. and the agitator was restarted. The batch was heated to 106° C. and the agitator speed was adjusted to 100 rpm. The reactants were allowed to cool to 114° C. and 24.5 grams of deionized water were added. This addition was followed by a 30 minute addition of 67.5 grams of the polyamidoamine surfactant solution from Example 1. At the end of the addition the batch was held at 98° C. for one hour. Afterwards, 76.33 grams of deionized water were added to the epoxy-surfactant polymer adduct. After this water addition the water-in-polymer dispersion inverted to form a polymer-in-water dispersion as it cooled to 60° C. The batch was allowed to mix at 100 rpm for one hour and then the surface area average particle size was measured at 0.61 micrometers by a Coulter LS230. After another hour of mixing, 15 grams of HELOXY® 8 monoepoxide followed by 28.94 grams of acetone were added to the dispersion as the temperature was allowed to drop from 60° C. to 48° C. The dispersion was mixed for an additional hour at 48° C. at 100 rpm and then it was diluted with 469.8 grams of deionized water.

The resulting diluted dispersion after a final 1 hour of additional mixing had a number average particle size of 0.47 micrometers and a weight average particle size of 0.56 micrometers. The surface area average particle size measured by Coulter was also 0.47 mirometers. The epoxy equivalent weight of the final dispersion was 521, the viscosity was 820 cP and the solids content was 52.6%. The pH of the batch after one month at 23° C. is reported below in Table 1.

COMPARATIVE EXAMPLE 4

Preparation of a Comparative Amidoamine Composition

To the stainless steel reactor of Example 1 were added 411.1 Kg of polyoxyethylene polyether glycol 4600 and 34 Kg of water. The mixture was heated to 53° C. and stirred overnight in an attempt to dissolve the PEG. The following morning, 4.94 Kg of 4-hydroxy TEMPO and a mixture of 4.9 Kg of 67% nitric acid and 11.9 Kg of water were charged to the reactor with stirring. The reactor jacket was then heated to 65° C. to dissolve remaining solid PEG on the reactor walls. The reactor vent was then closed, the temperature of the reaction mixture was lowered to about 50° C., and oxygen was added to the reactor from a 1A cylinder with a regulator. Sufficient oxygen was added to bring and keep the reactor to an oxygen pressure of 35 psig (244 kPa) in addition to the air which was in the reactor before oxygen addition. Very little reaction was seen at this temperature so the reaction mixture was gradually heated. A definite increase in oxygen consumption and reaction rate was noted when the reaction mixture had reached 59° C. The reactor was kept at 63–67° C. with stirring for 45 minutes as additional oxygen was added from the cylinder through a regulator set to keep the added oxygen pressure at 244 kPa. At this point, the cylinder pressure had dropped by 1350 psig (9.31 MPa), indicating that 5.73 Kg of oxygen had been transferred from the cylinder to the reactor. The oxygen cylinder regulator was then turned off and the reaction was continued for two additional hours at 59–63° C. with stirring in order to consume most of the oxygen in the headspace of the reactor.

At the end of this time the pressure of added oxygen in the reactor headspace had dropped to 8.0 psig (55 kPa) and the rate of oxygen consumption had become very slow. The remaining oxygen was vented and vacuum was applied to the reactor to bring the absolute pressure down to 6–10 kPa. The reactor temperature was increased to 93° C. to distill the water and remaining nitric acid into the overhead accumulator. Distillation was continued for 1.5 hours. Vacuum was broken to sample the product for acid equivalent weight. The acid equivalent weight was 2734, corresponding to 83.7% oxidation of the alcohol end groups. The overhead accumulator was drained.

The reactor contents were then cooled to 83° C. and 135.3 Kg of 2-methyl-1,5-pentanediamine (Du Pont Dytek A) were then charged to the reactor under vacuum. The reactor was then closed off and heated at 174–179° C. The mixture was allowed to react at this temperature for 4 hours under autogenous pressure. Vacuum (reactor absolute pressure of 5–10 kPa) was then applied to strip and the reactor was held at a temperature of 170–185° C. for 5 hours for removal of water (reaction product) and unreacted diamine. During the final 3 hours of this period, steam, and then nitrogen, stripping was used to assist the vacuum stripping in order to speed removal of unreacted Dytek A. Vacuum was broken and the reactor contents were sampled. The amine equivalent weight was 2841. The increase in amine equivalent weight over the acid equivalent weight was only 3.7%.

The reactor was then cooled to 139° C. and charged with 218.4 Kg of water to dissolve the product, followed by 25.4 Kg of CARDURA® E-10 (a glycidyl ester of a $C_{10}$ tertiary carboxylic acid). The mixture was stirred at 93° C. for one hour to react the epoxy groups of the CARDURA E-10 with the amine groups of the oxidized polyoxyethylene polyether glycol-diamine condensate. Solids content was measured and 31.9 Kg of additional water was added to adjust solids concentration to the desired level. The product was loaded out into drums.

The final product had a solids concentration of 64.6% and an amine equivalent weight of 3058 (solids basis). Gel permeation (size exclusion) chromatography of the product (polyoxyethylene polyether glycol calibration) showed a low molecular weight peak at a peak molecular weight of 4682 (85% of area) and a high molecular weight peak at a peak molecular weight of 9520 (15% of area, probably corresponding to coupled material). The total mixture had a number average molecular weight of 3489 and a weight average molecular weight of 5037. The percentage of oligomeric amidoamine compounds present in the amidoamine composition was calculated to be 15% by GPC.

COMPARATIVE EXAMPLE 5

In-situ Glycidation of the Polyamidoamine Composition of Comparative Example 4, and the Water Borne Dispersions Thereof To a standard resin flask reactor were added 534.15 grams EPON® Resin 828, 163.35 grams Bisphenol A and 0.60 grams triphenylphosphine. As the batch was heated to 132° C. the reactor was purged with $N_2$ under reduced pressure to deaerate and reduce moisture level in the components. The mixer was set at 100 rpm and the pressure was set at 17 inches Hg. When the components were homogeneous at 132° C. pressure was adjusted to atmospheric but the $N_2$ purge was maintained. The reactants were allowed to exotherm to 205° C. The reactants were allowed to cool to 187° C. and maintained at that temperature for one hour. At the end of the hour the epoxy equivalent weight was measured to be 478. The reactants were allowed to cool to 176° C. and were slowly diluted, under reflux, with 60 grams of propylene glycol monomethyl ether. The batch was allowed to cool to 114° C., the agitation was stopped and the reactant solution was allowed to stand overnight.

The next morning the reactant solution was reheated to 82° C. and the agitator was restarted. The batch was heated to 106° C. and the agitator speed was adjusted to 100 rpm. The reactants were allowed to cool to 114° C. and 26.55 grams of deionized water were added. This addition was followed by a 30 minute addition of 75 grams of the polyamidoamine surfactant solution from Comparative Example 4. At the end of the addition the batch was held at 98° C. for one hour. Afterwards, 85.34 grams of deionized water were added to the epoxy-surfactant polymer adduct. After this water addition the water-in-polymer dispersion inverted to form a polymer-in-water dispersion as it cooled to 60° C. The batch was allowed to mix at 100 rpm for one hour and then the surface area average particle size was measured at 0.644 micrometers by a Coulter LS230. After another hour of mixing, 15.00 grams of HELOXY® 8 monoepoxide followed by 28.95 grams of acetone were added to the dispersion as the temperature was allowed to drop from 60° C. to 48° C. The dispersion was mixed for an additional hour at 48° C. at 100 rpm and then it was diluted with 475.27 grams of deionized water.

The resulting diluted dispersion after a final 1 hour of additional mixing had a number average particle size of 0.597 micrometers, and a weight average particle size of 0.787 micrometers. The epoxy equivalent weight of the final dispersion was 538.99, the viscosity was 490 cP and the solids content was 52.28%. The pH of the batch after one month at 23° C. is reported below in Table 1.

TABLE I

| Example | Comparative 5 | 2 | 3 |
|---|---|---|---|
| Surfactant | Comparative 4 | 1 | 1 |
| Surf, % (based on solids) | 6.3 | 6.3 | 5.7 |
| Inversion % NVM Target | 79.00 | 79.00 | 80.00 |
| Acetone, % | 2.00 | 2.00 | 2.00 |
| Heloxy 8, % | 1.00 | 1.00 | 1.00 |
| In Process: | | | |
| WPE (fusion) | 477.75 | 490.00 | 492.20 |
| % NVM @ Inv | 79.00 | 79.00 | 80.00 |
| Temp @ Inv | 140 | 140 | 140 |
| Solids (target/actual), % | 52.00/52.28 | 52.00/52.5 | 52.50/52.60 |
| Viscosity, Cps | 490.00 | 1660 | 820 |
| WPE: | 538.99 | 519.22 | 520.8 |
| Ps (Dn)□m | 0.597 | 0.518 | 0.474 |
| Ps (Dw)□m | 0.787 | 0.670 | 0.559 |
| Ps (SA)□m | 0.479 | 0.377 | 0.470 |
| 90% particle with diameter less than | 0.865 □m | 0.627 □m | 0.713 □m |
| Hegman | 7½–8 | 7 | 7½ |
| PH | 9.63 | 9.44 | 9.21 |

The polyamidoamine surfactant made according to Comparative Example 4 did not contain oligomeric amidoamine compounds in an amount of greater than 20 wt. % based on the weight of amidoamine composition, and also was not made under reaction conditions effective to increase the amine nitrogen equivalent weight (before CARDURA E-10 glycidyl ester addition) of the amidoamine composition by at least 10% over the average acid equivalent weight of said polyoxyalkylene polyether polyacid composition. The increase in amine nitrogen equivalent weight of the amidoamine composition over the acid equivalent weight of the polyacid composition was only 3.7%. The surfactant of Comparative Example 4, used in an amount of 6.3% based on solids, could only effectively disperse the epoxy resin compounds in water to a surface area average particle size of 0.597 micrometers to make a solution having a pH of 9.63. By contrast, the amidoamine composition of the invention, made according to Example 1, when used in the same amount (6.3% based on solids), effectively dispersed the same epoxy resin to a lower number average particle size of 0.518 micrometers to make a solution having a lowered pH of 9.44 as shown in Example 2.

The efficiency of the amidoamine surfactant composition was further demonstrated in Example 3, where a lower amount of Example 1 surfactant was used (5.7% based on solids), to disperse the epoxy resin to a lower number average particle size of 0.474 micrometers (a 20% reduction over Comparative Example 5) and a pH of 9.21 (a reduction of 0.4 pH points over Comparative Example 5). By using the surfactant of the invention, one may use less surfactant while simultaneously obtaining a reduction in particle size and dispersion pH.

We claim:

1. An epoxy functional surfactant comprising the reaction product of:

i) an amidoamine composition comprising oligomeric amidoamine compounds having the structure:

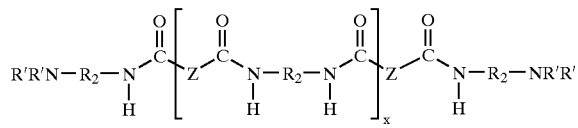

wherein each R' is independently hydrogen or an alkyl group containing 1–6 carbon atoms provided that at least one R' is hydrogen, $R_2$ is an aliphatic, cycloaliphatic, or aromatic residue of a primary amine compound having 2 to 24 carbon atoms and optionally containing non-reactive oxygen or at most an average of 4 secondary and/or tertiary nitrogen atoms in the backbone of the primary amine compound, the average of x, based on the amidoamine composition, is at least 0.2, and Z comprises the residue of a polyoxyalkylene polyether polycarboxylic acid compound; with ii) at least one epoxy resin having a functionality of from greater than 0.8 epoxide group per molecule at an equivalent weight ratio of the epoxy resin to the amidoamine composition of at least 2:1;

wherein the amidoamine composition comprises the reaction product of primary polyamine compounds with polyoxyalkylene polyether polycarboxylic acid compounds at a corresponding equivalent weight ratio of at least 4.0:1 under oligomeric reaction conditions effective to increase the amine nitrogen equivalent weight of the amidoamine composition by at least 10% over the average acid equivalent weight of the polyoxyalkylene polyether polyacid composition.

2. The epoxy functional surfactant of claim 1, wherein each R' is hydrogen, $R_2$ is an aliphatic moiety having from 2 to 8 carbon atoms, and wherein x ranges from 0.25 to 2.0.

3. The epoxy functional surfactant of claim 1, wherein x ranges from 0.2 to 1.0.

4. The epoxy functional surfactant of claim 1, wherein $R_2$ is a residue of a primary polyamine compound comprising ethylenediamine, hexamethylenediamine, 2-methyl-1,5-pentanediamine, or 1,12-dodecanediamine.

5. The epoxy functional surfactant of claim 1, wherein the polyoxyalkylene polyether polycarboxylic acid composition comprises compounds represented by the following formula:

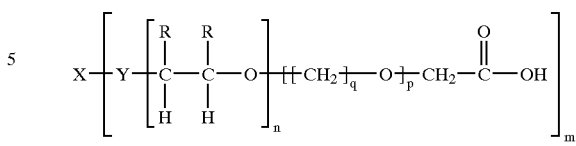

wherein X is an initiator molecule residue, the initiator having a functionality of from 1 to 8; Y represents an oxygen or nitrogen atom; each of the R groups are independently hydrogen, an $C_1$–$C_{16}$ alkyl, aryl, or alkaryl group, provided that at least one R is hydrogen; m is a real number from 1.0 to 8.0; n and p represent the number of repeating units of oxyalkylene groups together ranging from 0 to about 4000, provided that n+p is at least 15, and q ranges from 2 through 4, inclusive, and m is a real number ranging from greater than 1.0 and up to 3.0.

6. The epoxy functional surfactant of claim 5, wherein R independently comprises a hydrogen or a methyl group.

7. The epoxy functional surfactant of claim 5, wherein n+p ranges from 50 to 1000, and q is 2.

8. The epoxy functional surfactant of claim 5, wherein the n units represent an oxyalkylene selected from the group consisting of oxyethylene and a mixture of oxyethylene and oxypropylene groups, p is 0, each R group is hydrogen, and m is a real number greater than 1.0 and up to 2.0.

9. The epoxy functional surfactant of claim 5, wherein m ranges from 1.6 to 2.0, and the number average molecular weight of the polyoxyalkylene polyether polycarboxylic acid composition ranges from 3000 to about 6,000.

10. The epoxy functional surfactant of claim 1, wherein said polyoxyalkylene polyether polycarboxylic acid composition is derived from a polyoxyalkylene polyether polyol composition, and from 90% to no more than 99% of the hydroxyl groups in the polyoxyalkylene polyether polyol composition are converted to carboxyl end groups.

11. The epoxy functional surfactant of claim 1, wherein the equivalent ratio of primary polyamine compounds to polyoxyalkylene polyether polycarboxylic acid compounds is at least 6.0 amine equivalents to 1 acid equivalent.

12. The epoxy functional surfactant of claim 1, wherein the average amine equivalent weight of the amidoamine composition ranges from 1100 or more and up to 10,000.

13. The epoxy functional surfactant of claim 1, comprising at least partially capping the amidoamine composition with a monoepoxy capping agent.

14. The epoxy functional surfactant of claim 13, comprising at least partially capping the amidoamine composition with a monoepoxy capping agent comprising one or more of the unsaturated epoxy hydrocarbons of butylene, cyclohexene, or styrene oxide; epoxy ethers of monovalent alcohols; epoxides of the alkylene oxide adducts of alcohols having at least 8 carbon atoms by the sequential addition of alkylene oxide to a corresponding alkanol; epoxy ethers of monovalent phenols optionally substituted in the o- or p-positions with $C_1$–$C_{21}$ branched or unbranched alkyl; aralkyl, alkaryl, or alkoxy groups; glycidyl esters of monocarboxylic acids comprising the glycidyl ester of capric acid, the glycidyl ester of lauric acid, the glycidyl ester of stearic acid, the glycidyl ester of arachidic acid or the glycidyl esters of alpha, alpha-dialkyl monocarboxylic acids; epoxy esters of unsaturated alcohols or unsaturated carboxylic acids comprising the glycidyl ester of neodecanoic acid, epoxidized methyl oleate, epoxidized n-butyl oleate, epoxidized methyl palmitoleate, or epoxidized ethyl linoleate;

phenyl glycidyl ether; allyl glycidyl ether; or acetals of glycidaldehyde.

15. The epoxy functional surfactant of claim 13, wherein the amount of said epoxy functional surfactant ranges from 2 to less than 6.0 wt. %, based on the weight of solids.

16. The epoxy functional surfactant of claim 1, wherein the epoxy functional surfactant is made in situ.

17. An epoxy functional surfactant comprising the reaction product of:
  i) an amidoamine composition comprising oligomeric amidoamine compounds in an amount of at least 20 wt. % to 80 wt. % based on the weight of amidoamine composition, said oligomeric amidoamine compounds having the structure:

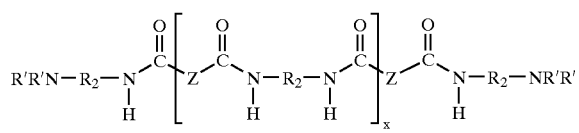

wherein each R' is independently hydrogen or an alkyl group containing 1–6 carbon atoms provided that at least one R' is hydrogen, preferably two R' are hydrogen, most preferably all four R' are hydrogen, wherein $R^2$ is an aliphatic, cycloaliphatic, or aromatic residue of a primary amine compound having 2 to 24 carbon atoms and optionally containing non-reactive oxygen or at most an average of 4 secondary and/or tertiary nitrogen atoms in the backbone of the primary amine compound, and preferably $R^2$ is an aliphatic moiety having from 2 to 8 carbon atoms, the average of x based on the amidoamine composition is at least 0.2, and Z comprises the residue of a polyoxyalkylene polyether polycarboxylic acid compound; with
  ii) at least one epoxy resin having a functionality of from greater than 0.8 epoxide group per molecule at an equivalent weight ratio of the epoxy resin to the amidoamine composition of at least 2:1;
wherein the amidoamine composition comprises the reaction product of primary polyamine compounds with polyoxyalkylene polyether polycarboxylic acid compounds at a corresponding equivalent weight ratio of at least 4.0:1.

18. The epoxy functional surfactant of claim 17, wherein at least two R' are hydrogen, $R_2$ is an aliphatic moiety having from 2 to 8 carbon atoms, and wherein the average value of x ranges from 0.2 to 2.0.

19. The epoxy functional surfactant of claim 17, wherein each R' is hydrogen, and $R_2$ is a residue of a primary polyamine compound comprising ethylenediamine, hexamethylenediamine, 2-methyl-1,5-pentanediamine, or 1,12-dodecanediamine.

20. The epoxy functional surfactant of claim 17, wherein the polyoxyalkylene polyether polycarboxylic acid composition comprises compounds represented by the following formula:

Formula III

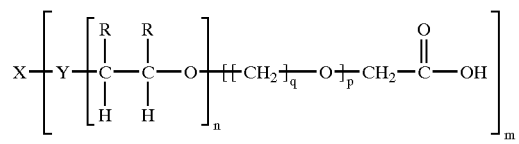

wherein X is an initiator molecule residue, the initiator having a functionality of from 1 to 8; Y represents an oxygen or nitrogen atom; each of the R groups are independently hydrogen, an $C_1$–$C_{16}$ alkyl, aryl, or alkaryl group, provided that at least one R is hydrogen; m is a real number from 1.0 to 8.0; n and p represent the number of repeating unit of oxyalkylene groups together ranging from 0 to about 4000, provided that n+p is at least 15, and q ranges from 2 through 4, inclusive, and m is a real number ranging from greater than 1.0 and up to 3.0.

21. The epoxy functional surfactant of claim 17, wherein R independently comprises a hydrogen or a methyl group.

22. The epoxy functional surfactant of claim 17, wherein n+p ranges from 50 to 1000, and q is 2.

23. The epoxy functional surfactant of claim 17, wherein the n units represent an oxyalkylene selected from the group consisting of oxyethylene and a mixture of oxyethylene and oxypropylene groups, p is 0, each R group is hydrogen, and m is a real number greater than 1.0 and up to 2.0.

24. An aqueous dispersion of an epoxy resin comprising the epoxy functional surfactant of claim 17.

* * * * *